May 3, 1927.  W. W. EDSON  1,626,603
REGULATOR SYSTEM
Filed June 23, 1925  4 Sheets-Sheet 1

WITNESSES:
G. S. Neilson
J. E. Hardy

INVENTOR
William W. Edson
BY
Wesley G. Carr
ATTORNEY

May 3, 1927.  
W. W. EDSON  
1,626,603  
REGULATOR SYSTEM  
Filed June 23, 1925  
4 Sheets-Sheet 3

WITNESSES:  
G. S. Neilson  
J. E. Hardy

INVENTOR  
William W. Edson  
BY  
Wesley G. Carr  
ATTORNEY

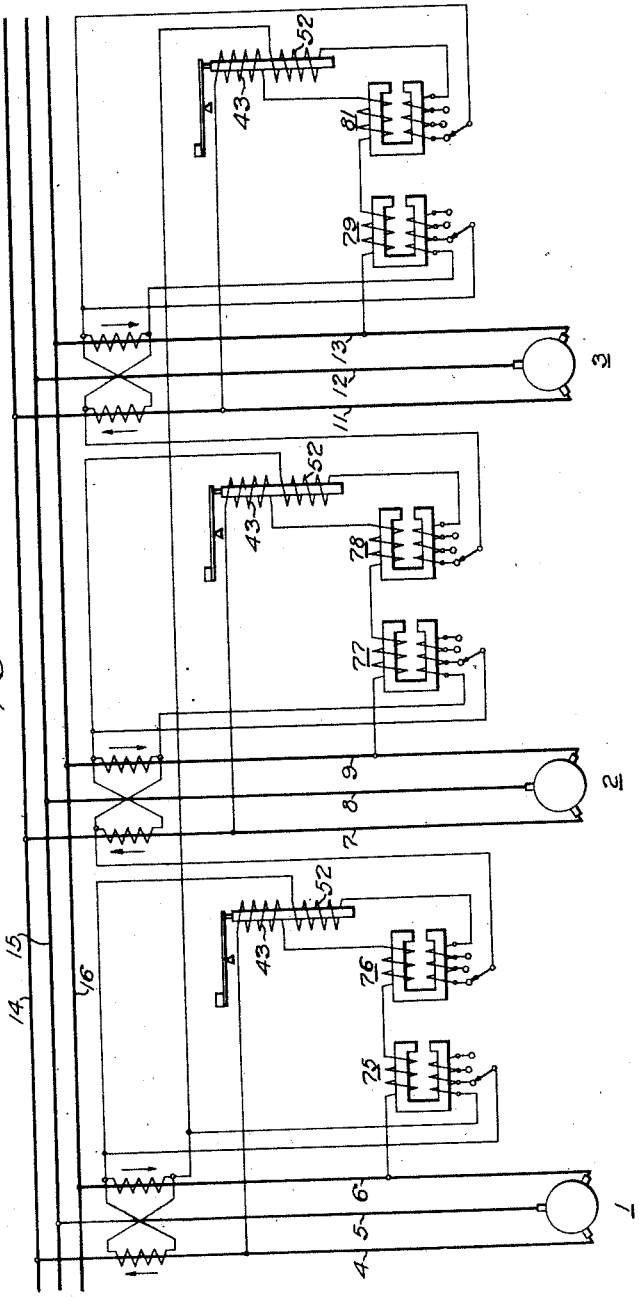

Patented May 3, 1927.

1,626,603

UNITED STATES PATENT OFFICE.

WILLIAM W. EDSON, OF NEWTONVILLE, MASSACHUSETTS, ASSIGNOR TO WESTINGHOUSE ELECTRIC & MANUFACTURING COMPANY, A CORPORATION OF PENNSYLVANIA.

REGULATOR SYSTEM.

Application filed June 23, 1925. Serial No. 39,060.

My invention relates to regulator systems and more particularly to regulator systems wherein a number of generators are connected together to operate in parallel-circuit relation.

One object of my invention is to provide such regulator system with means adapted to compensate for voltage line drop and for cross-currents between the generators.

Another object of my invention is to provide such a regulator system with means for compensating for load current in the line, for leading or lagging wattless current in the line, and also for cross-currents between the generators.

For complete line drop compensation it is necessary to consider two factors, namely, reactive drop and ohmic drop in the line and transformers, between the generator station and the distributing center. The ohmic component of line drop is compensated for by passing a current that is proportional to the line current through a series winding on the regulator control magnet, while the reactive component is compensated for by means of an external inductive compensator that introduces a voltage, directly into the patential circuit of the regulator, that is proportional to the reactive drop.

When two or more voltage regulators are operated to regulate a like number of alternating-current generators connected to the same bus, in parallel relation, it is not possible to compensate in this way for the complete ohmic and reactive line drop. The phenomena involved in such operation is similar to that of two compound-wound direct-current generators operated in parallel without an equalizer bus.

In the parallel operation of alternating-current generators, the field excitation of the generators plays no part in the division of power between the generators. The proportion of power carried by each generator will depend upon the governor setting of the prime mover driving the generator. Changes in the field excitation of alternators connected in parallel circuit relation directly affects the amount of wattless power supplied by the generator. Inasmuch as a voltage regulator acts directly to vary the field excitation of the generator, it is clear that the division of power between generators is unaffected by the voltage regulator, whereas the division of reactive current is directly affected. In order to secure stability in the parallel operation of regulators, it is customary to regulate the generated voltage to droop with increase in the wattless component of generated current. That is to say, the action of the regulator, as to the wattless component of current, is the reverse of that necessary for line drop compensation. The inductive compensator is connected in the same way to give a drooping characteristic as when used to compensate for reactive line drop, except that the connections to the primary winding of the compensator are reversed, so that the regulator reduces the voltage instead of raising it with an increase in wattless current. This element lowers the regulated voltage in proportion to the wattless component of current and affords the requisite stabilizing element for parallel operation.

It is desirable in many cases to compensate for line drop without producing a drooping characteristic with increased wattless current. One method of obtaining this result is to compensate each regulator to have for example, a 6% drooping characteristic as to the load on its associated generator, and to have for example, a 12% rising characteristic as to the total load of the station.

In the accompanying drawing.

Figure 2:
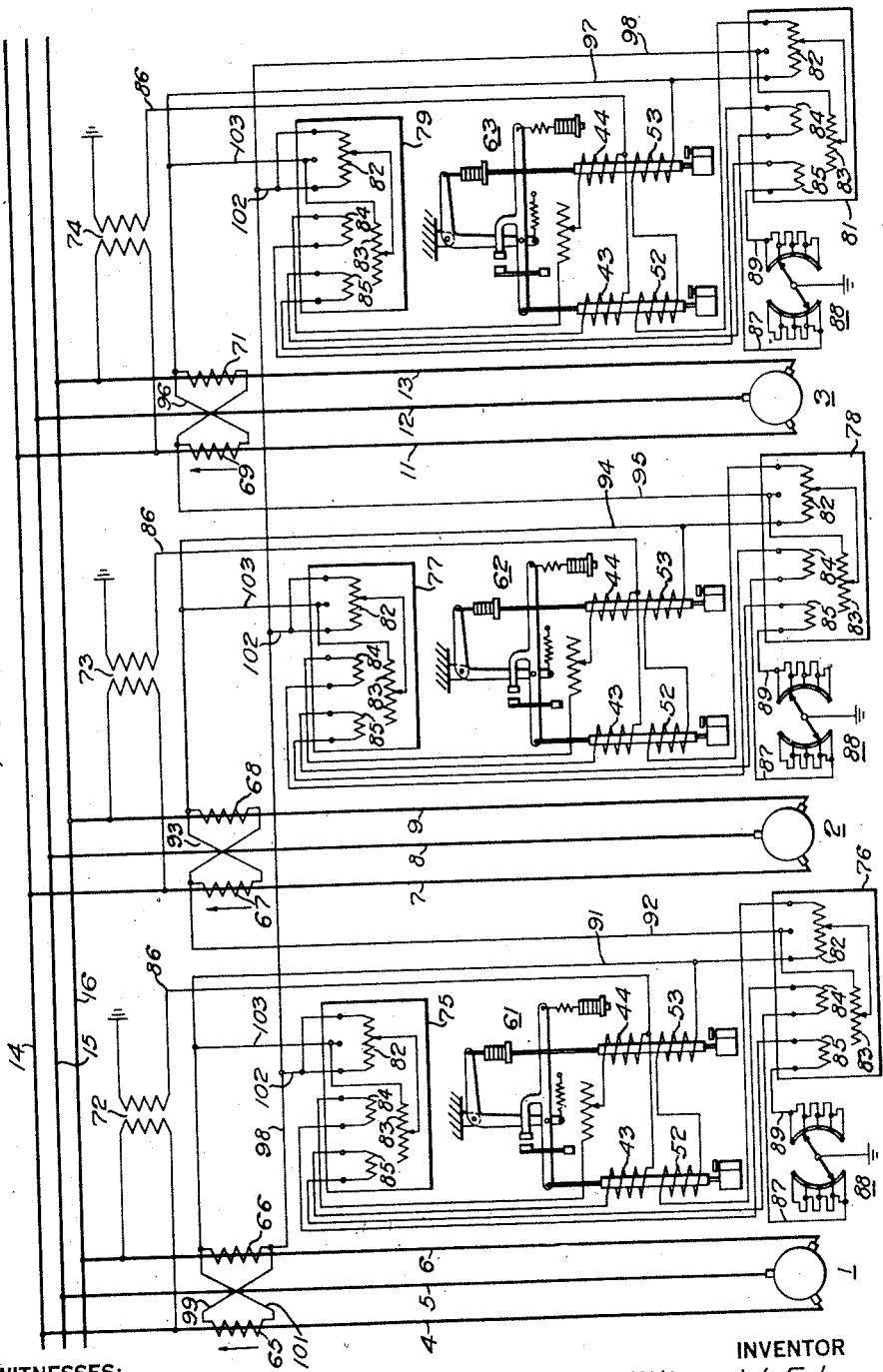
Fig. 2 illustrates a diagrammatic view of another embodiment of my invention.
Figure 4:
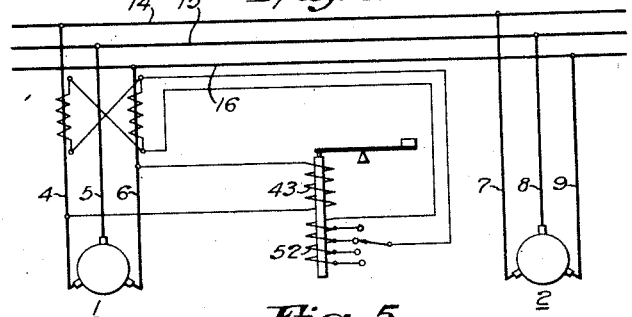
Figure 5:
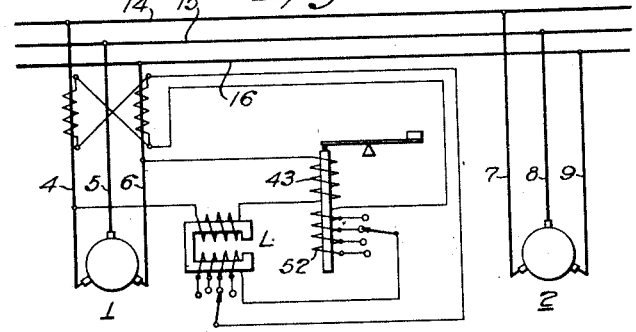
Figure 6:
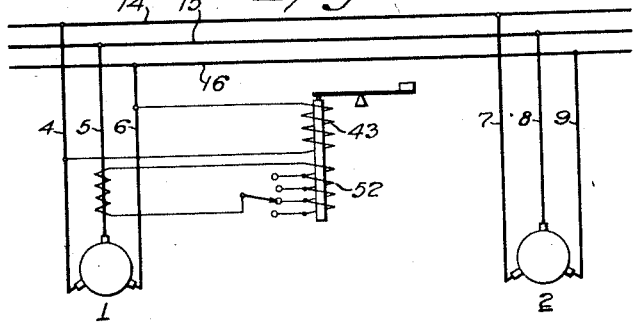

Fig. 4 is a schematic diagram illustrating a system for compensating the regulator for ohmic line drop, Fig. 5 is a schematic diagram illustrating a system provided with means to compensate for both the ohmic and the reactive components of line drop, Fig. 6 is a schematic diagram illustrating a connection for compensating for the wattless reactive component of a generated current, and Fig. 7 is a schematic diagram further illustrative of the system of Fig. 2.

Figure 1:
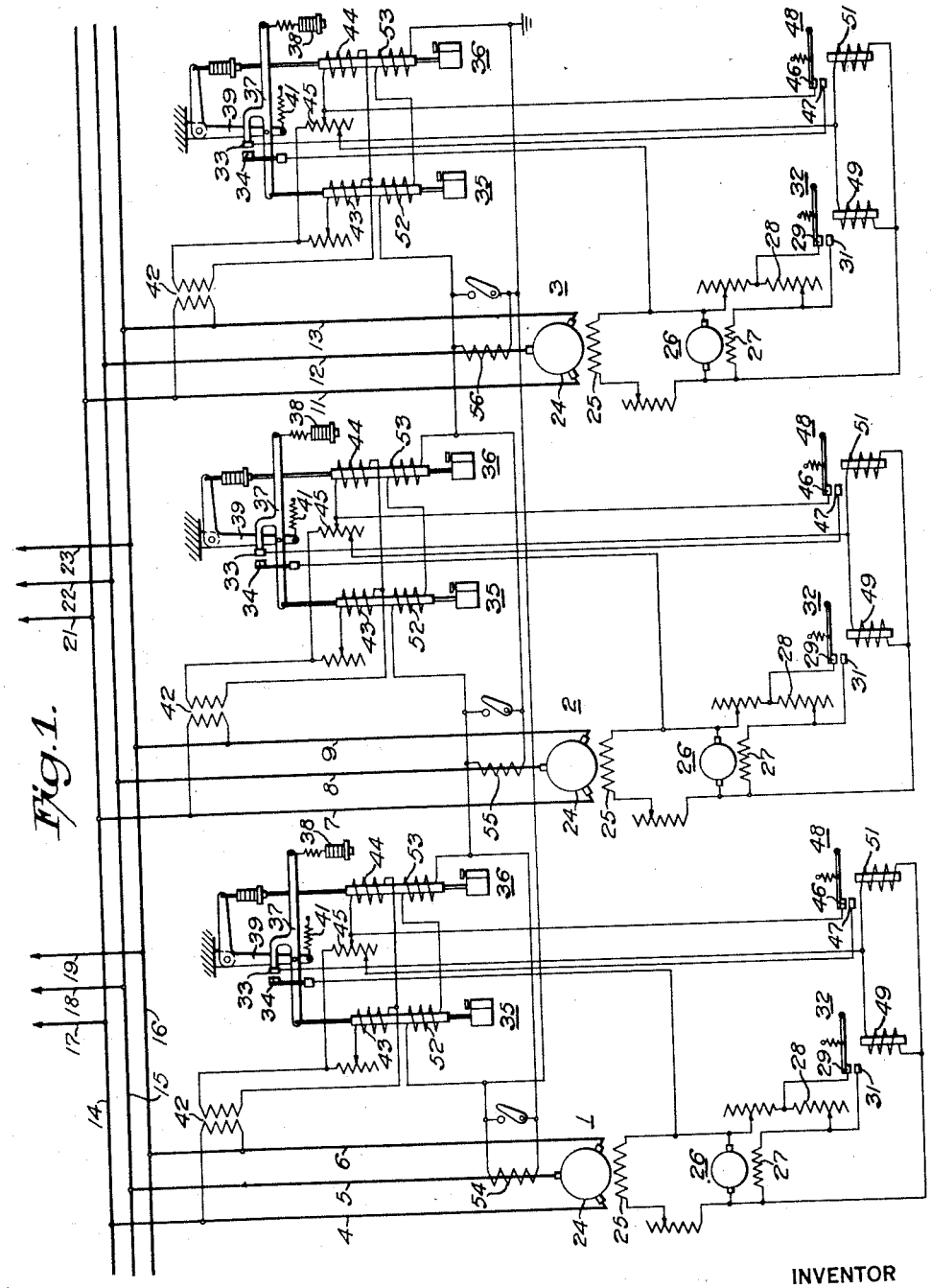
Figure 1 illustrates a diagrammatic view of one embodiment of my invention.

Referring to Fig. 1 of the drawing, a plurality of generators 1, 2 and 3 are connected by means of conductors 4, 5, 6 and 7, 8, 9, and 11, 12, 13, respectively, to tie-in busses 14, 15, 16 to which a plurality of feeder circuits 17, 18, 19 and 21, 22, 23 may be connected.

Each generator is provided with an armature winding 24 and a field winding 25 that is connected to an exciter generator 26. The exciter generator is provided with a field winding 27 that is connected in series-circuit relation with a resistor 28, which is adapted to be short-circuited upon engagement of relay contact members 29 and 31 that are operated in accordance with the energization of a relay 32. The relay 32 is operated in accordance with the operation of the main regulator contact members 33 and 34, one contact member being stationary and the other being mounted upon a bell crank lever 37 and operated in accordance with the energization of the control electromagnet 35, against the pull of a weight 38. The lever 37 is pivotally mounted upon a bell crank lever 39 that is operated in accordance with the energization of an antihunting electromagnet 36, against the pull of a spring member 41.

A voltage transformer 42 is connected to each generator circuit and to the voltage windings 43 and 44 of the regulator magnets. In circuit with the winding 44 a resistor 45 is provided that is adapted to be short-circuited upon the engagement of contact members 46 and 47 of a relay 48. The relays 32 and 48 are provided with operating windings 49 and 51, respectively, which are energized upon engagement of the regulator contact members 33 and 34. The regulator magnets 35 and 36 are also provided with current windings 52 and 53, respectively, which are connected in series-circuit relation with each other and with a current transformer that is responsive to the flow of current from the associated generator. The three current transformers 54, 55 and 56, which are respectively associated with the generators 1, 2 and 3, are connected together in vector parallel relation to form a loop circuit, so that each current transformer is responsive to the flow of current from each generator.

The drawing illustrates the use of a single transformer in each generator circuit but two transformers in each line may be used having the conventional cross-connection.

Referring to the form of the invention illustrated in Fig. 2, the three generators 1, 2 and 3 are each provided with similar vibratory regulators 61, 62 and 63. The exciters and relay circuits employed in this modification of the invention are the same as those illustrated in Fig. 1 and are omitted in Fig. 2 of the drawing. The current windings 52 and 53 of the several regulators are connected respectively to cross-connected current transformers 65 and 66, 67 and 68; and 69 and 71 in the respective circuits of the three generators. The voltage windings 43 and 44 of the three regulators are connected respectively to voltage transformers 72, 73 and 74. Reactive compensators 75, 76, 77, 78, 79 and 81 are also provided for the regulators. Two compensators are provided for each regulator, one being connected in a manner to compensate for the wattless current of the associated generator, and the other compensator being so connected as to cause the regulator to compensate for the reactive component of current from all of the several generators, which corresponds to the reactive voltage line drop.

Each compensator is provided with an auto-transformer 82 having a primary winding 83 that is connected to be energized from the current transformers and having a plurality of secondary windings 84 and 85 that are connected in the voltage circuit of the regulator. The reactive compensators 76 and 78 and 81 compensate for the reactive component of the entire station or line current, inasmuch as they are all connected in series relation with each other and with the current coils of the several regulators thus forming a loop circuit. The compensators 75, 77 and 79 are connected to compensate for the wattless current of their respective generators or for cross-currents between the generators. The connections of these compensators will be traced in detail later in explaining the operation of the system.

Figure 3:
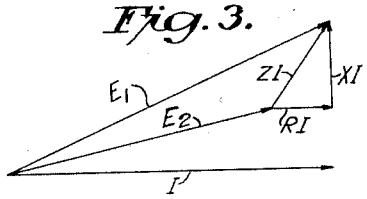
Fig. 3 illustrates a vector diagram of voltage line drop.

The principle by which the line drop compensation is accomplished will be clear from the vector diagram of line voltages in Fig. 3, in which $E_1$ is the generator station voltage, $E_2$ the terminal voltage, RI is the ohmic of the line and XI is the reactive drop. If the regulator could be energized by pilot wires running back from the distributing center it would receive a voltage $E_2$ and could adjust the excitation of the generator to maintain $E_2$ constant. Since it is not practical to do this, the regulator potential winding is energized from the generator bus voltage, that is in accordance with the value of $E_1$, and the two components of voltage line drop, XI and RI, are subtracted artificially by the compensating circuits so as to supply the regulator with an excitation that will maintain the distributing center at the resultant voltage $E_2$.

A method of deriving the RI component of line drop is indicated in Fig. 4, which shows the main control magnet of a regulator energized by the potential across the two outside lines of a three-phase circuit, and also by the current derived from two series transformers that are connected in the outside lines in vector parallel relation. The ohmic or RI component of line drop is compensated for by passing this resultant current through the series winding of the regulator main control magnet.

A method of compensating both for the ohmic, and for the reactive components of voltage line drop is illustrated in Fig. 5. The reactive or XI component of current is compensated for by means of an external reactive compensator L which introduces a voltage into the potential circuit of the regulator that is proportional to the reactive component of the line current. The primary winding of the reactive compensator is connected in series circuit relation with the current winding of the regulator and, because of the large air gap of the inductive compensator transformer, produces a voltage that is 90° out of phase with the line current. The passage of the current through the series winding on the regulator will produce a change in the regulated voltage in accordance with the phase relations of the load current and, therefore, represents the RI drop of the equivalent single phase line; while the passage of current through the reactive compensator L introduces a voltage in the potential circuit that will produce a change in the regulated voltage corresponding to a voltage 90° out of phase with the load current and, therefore, represents the XI drop of the line.

As previously pointed out, to give stability to the system in the parallel operation of alternating current regulators, it is necessary to regulate the voltage to droop with increase in the wattless component of the generated current.

The inherent droop with respect to wattless power may be obtained by influencing the regulator with a current from a series transformer in the middle leg of a three-phase circuit as shown in Fig. 6. At 100% power factor, the current in the transformer is at right-angles to the phase voltage.

In order to avoid the necessity for giving the regulator a drooping characteristic with increase in the wattless component of the generated current, in accordance with the present invention, I connect the current transformers of the several generators in series circuit relation with each other and with the current coils of each regulator. The current transformers being connected in this manner, the regulator is compensated for the total voltage line drop and for wattless cross-currents between the generators.

In the operation of the form of my invention illustrated in Fig. 1, an increase in load on any machine causes an increase in the current through all of the current transformers because of their loop circuit connection. The normal outflow of power from the generators causes current to flow in the same direction through the several transformers and, therefore, has the same effect on each of the regulators. With a local cross-current between two generators, however, such as between the machines 1 and 2, there would be an excessive outflow of wattless current from, say, machine 1 and a corresponding inflow of this wattless current to machine 2. This local current would increase the voltage across the transformer 54 by an amount corresponding to the current in the local circuit, and decrease the voltage across the transformer 55 by a like amount. This condition would cause the regulator associated with the generator 1 to correct the excitation of the generator in one direction, and cause the regulator associated with the generator 2 to correct the excitation of that generator in the opposite direction. However, the total current in the loop circuit comprising the three transformers 54, 55 and 56 would be unchanged, inasmuch as the increase in the voltage across transformer 54 would be balanced by the decrease in the voltage across the transformer 55, so that the regulator associated with the generator 3 would not be affected by a flow of cross-currents between the other two machines.

Referring again to Fig. 2, the voltage coils 43 and 44 of the regulators 61, 62 and 63 are energized from their associated voltage transformers 72, 73 and 74 respectively, by means of conductor 86, the circuit of the coil 44 being through the secondary windings 84 of the reactive compensators 75 and 76, and by means of conductor 87 to one side of a voltage-balancing rheostat 88 and the circuit of the winding 43 being through the secondary windings 85 of the compensators 75 and 76 and by means of conductor 89 to the other side of the voltage-balancing rheostat.

The current coils 52 and 53 of the several regulators are connected in loop circuit as stated above, the circuit being traced as follows. Beginning at the top of the current transformer 66 the circuit follows the conductor 91 through the current coils 52 and 53 of the regulator 61, auto-transformer 82 and primary winding 83 of the reactive compensator 76, conductor 92 to the top of the current transformer 67, through this transformer, conductors 93 and 94 to the current coils 52 and 53 of the regulator 62, compensator 78 to the current transformer 69, conductors 96 and 97, the current coils 52 and 53 of the regulator 63, the compensator 81, conductor 98 and by means of the cross-connections 99 and 101 through the transformer 65 back to the top of transformer 66.

The current flowing in this loop circuit compensates for the total ohmic line drop by varying the energization of the current coils of the regulator. Inasmuch as the current flowing through this loop circuit is a measure of the total station output of current, the current induced in the voltage circuit by the compensators 76, 78 and 81 causes the regulators to be compensated for the total reactive component of the generated current of the station.

The compensators 75, 77 and 79 each have their primary windings 83 connected in shunt relation to their associated current transformers by means of conductors 102 and 103, and these compensators introduce into the voltage circuit of their respective regulators a voltage that is proportional to the wattless current of the associated generator to compensate the regulator for cross-currents between the generators. In case of cross-currents between generators there will be an inflow of wattless current to certain of the machines corresponding to an outflow of wattless current from the other machines, so that certain of the regulators will compensate in one direction while others will compensate in the opposite direction.

In Fig. 7, the essential elements of the regulating system of Fig. 2, comprising the voltage and current coils of the control magnet 43 and 52 and the reactive compensators 75, 76, 77, 78, 79 and 81 are schematically illustrated in a manner similar to that employed in Figs. 4, 5 and 6.

The invention has been illustrated in connection with the use of three generators that are connected together in parallel circuit relation. It is obvious, however, that the invention may be practiced with any number of generators connected in the same manner.

Many modifications of my invention may be made without departing from the spirit thereof and I do not wish to be limited other than by the scope of the appended claims.

I claim as my invention:

1. In a regulator system, a plurality of generators connected in parallel relation, a voltage regulator for each generator having a control electromagnet provided with two windings, one of said windings being responsive to the voltage of its associated generator, the other of said windings being responsive to the current flow from all of said generators, and means for compensating said regulator in accordance with the reactive component of line current from all of said generators.

2. In a regulator system, a plurality of generators connected in parallel relation, a voltage regulator for each generator having a control electromagnet provided with two windings, one of said windings being responsive to the voltage of its associated generator, the other of said windings being responsive to the current flow from all of said generators, and means for compensating said regulator in accordance with the wattless cross-currents between said generators.

3. In a regulator system, a plurality of generators connected in parallel relation, a voltage regulator for each generator having a control electromagnet provided with two windings, one of said windings being responsive to the voltage of its associated generator, the other of said windings being responsive to the current flow from all of said generators, means for compensating said regulator in accordance with the reactive component of line current from all of said generators, and means for compensating said regulator in accordance with the wattless cross-currents between said generators.

4. In a regulator system, a plurality of generators connected to a transmission line in parallel relation, a voltage regulator for each generator having a control electromagnet provided with two windings, means for energizing one of said windings in accordance with the voltage of its associated generator, means for energizing the other of said windings in accordance with the line current, and means for introducing into the circuit of said first-named winding a voltage that is proportional to the reactive component of line current.

5. In a regulator system, a plurality of generators connected to a transmission line in parallel relation, a voltage regulator for each generator having a control electromagnet provided with two windings, means for energizing one of said windings in accordance with the voltage of its associated generator, means for energizing the other of said windings in accordance with the line current, and means for introducing into the circuit of said first-named winding a voltage that is proportional to the cross-currents of said associated generator.

6. In a regulator system, a plurality of generators connected to a transmission line in parallel relation, a voltage regulator for each generator having a control electromagnet provided with two windings, means for energizing one of said windings in accordance with the voltage of its associated generator, means for energizing the other of said windings in accordance with the line current, means for modifying the energization of said first-named windings in accordance with the reactive component of the line current, and means for modifying the energization of said first-named winding in accordance with the cross-currents of said associated generator.

7. In a regulator system, a plurality of generators connected to a transmission line in parallel relation, a voltage regulator for each generator, means for energizing said regulator in accordance with the voltage of its associated generator, means for energizing said regulator to compensate for voltage drop in the transmission line, and means for energizing said regulator to compensate for the cross-currents of said associated generator.

8. In a regulator system, a plurality of generators connected to a transmission line in parallel relation, a voltage regulator for each generator having a control electromagnet provided with two windings, means for energizing one of said windings in accordance with the voltage of its associated generator, means comprising a loop circuit including the second windings of the several regulators for energizing said regulator to compensate for voltage drop in the transmission line, and means for modifying the action of said regulator to compensate for cross-currents.

9. In a regulator system, a plurality of generators connected to a transmission line in parallel relation, a voltage regulator for each generator, means for energizing said regulator in accordance with the voltage of its associated generator, a current transformer associated with each generator, means comprising a loop circuit including said current transformers connected in vector alinement for energizing said regulator to compensate for voltage drop in the transmission line, and means connected in shunt relation to each current transformer for energizing the associated regulator to compensate for cross-currents.

10. In a regulator system, a plurality of generators connected to a transmission line in parallel relation, a voltage regulator for each generator, means for energizing said regulator in accordance with the voltage of its associated generator, means for energizing said regulator to compensate for voltage drop in the transmission line, and means energizing said regulator to correct for wattless current in the line.

In testimony whereof, I have hereunto subscribed my name this fifth day of June, 1925.

WILLIAM W. EDSON.